Figure 1:
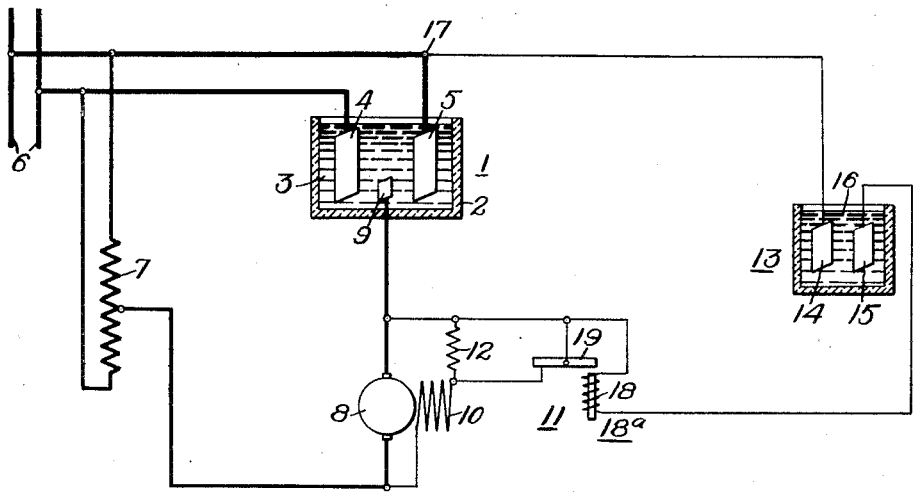

March 10, 1931.   J. SLEPIAN   1,795,900

ELECTROLYTIC CONDENSER

Filed Dec. 30, 1919

WITNESSES:
J.A. Helsel
O.E. Bee.

INVENTOR
Joseph Slepian.
BY
Wesley G. Carr
ATTORNEY

Patented Mar. 10, 1931

1,795,900

UNITED STATES PATENT OFFICE

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA

ELECTROLYTIC CONDENSER

Application filed December 30, 1919. Serial No. 348,450.

My invention relates to electrolytic condensers and, more particularly, to condensers of the type formed by employing a plurality of film-forming electrodes immersed in a suitable electrolyte, and it has, for its primary object, the construction of condensers of the above-designated type which shall be particularly adapted for application in an alternating-current circuit having a variable voltage.

It has been found that a direct-current excitation assures good operating conditions in an electrolytic condenser by maintaining the potential of the film-forming electrodes positive with respect to the electrolyte. However, the good results obtained by employing a direct-current excitation are distinctly manifest only when the electrolytic condenser is connected to a constant-voltage working circuit. I have found that the good results obtained by direct-current excitation are offset, to a great extent, when the condensers are connected in variable-voltage circuits.

One object of my invention, therefore, resides in the provision of means for obtaining the good results afforded by direct-current excitation when electrolytic condensers are applied to alternating-current working circuits having variable voltages.

With these and other objects in view, my invention will be more fully described, illustrated in the drawings, in the several views of which corresponding numerals indicate like parts, and then particularly pointed out in the claims.

Figure 2:
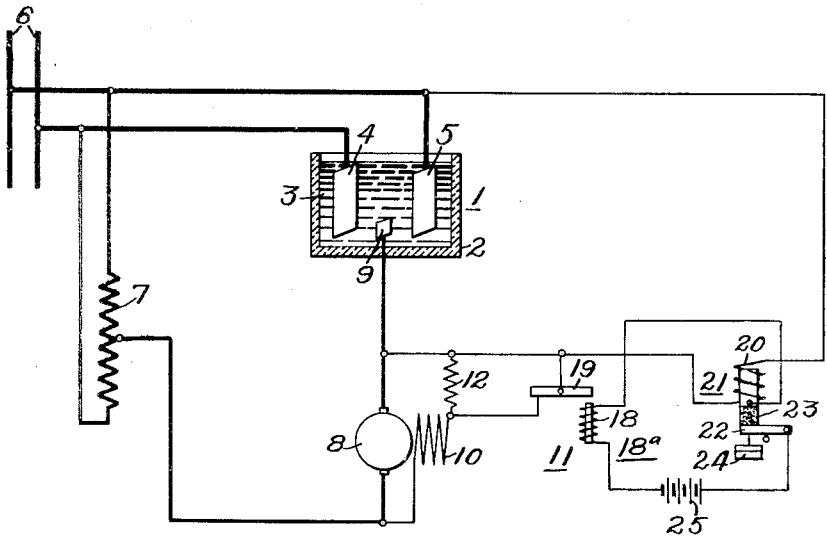

In the drawings, Fig. 1 is a diagrammatic view of an electrolytic condenser provided with means for direct-current excitation which is so controlled that a variable voltage impressed on the condenser does not offset the good effects of the direct-current excitation, and Fig. 2 is a similar view illustrating a modification of my invention.

I have found, by extensive tests, that the capacitance of an electrolytic condenser is affected by changes in the maximum value of alternating potential impressed upon the condenser. I have further found that the undesirable effects experienced by the changes in capacitance may be offset by varying the direct-current excitation with variations in the maximum value of alternating potential impressed on the condenser.

It will be understood that in an electrolytic condenser, the films which build up on the film-forming electrodes have a film voltage stress and other film characteristics dependent, in part, upon the maximum value of the pulsating or alternating potentials impressed thereupon, the reason for this phenomenon being that the films do not immediately disappear upon the removal of the film-forming potential and hence the final film formation attained in the device is that corresponding, inter alia, to the peak voltage in the cycle which is applied to the film. However, there is a limit beyond which it is impractical to raise the above-mentioned peak voltage, or film-forming voltage, because at a certain critical value an excessive leakage current begins to flow in the condenser, resulting in an unsatisfactory power factor and excessive heating.

In practicing my invention, I employ means for decreasing the direct-current excitation of an "excited" condenser when a maximum, or critical, value of potential impressed on the condenser electrodes is exceeded and means for increasing the direct-current excitation with a decrease of potential from such maximum or critical value. By the process of so varying the direct-current excitation, the capacitance of an electrolytic condenser may be maintained substantially constant, thus insuring a satisfactory value of power factor and a long life of the condenser plates. The value of the impressed voltage at which an electrolytic condenser permits a large leakage current to flow is, of course, determined by the nature of the elements employed in the condenser, such as the electrolyte and its degree of concentration. An electrolytic condenser may be constructed to operate satisfactorily at various values of maximum potential impressed thereon by proper selection of material and, of course, when this maximum value is exceeded, an excess leakage current will traverse the condenser, the value of the current depending upon the excess value of impressed voltage.

In Fig. 1 is shown a condenser 1 comprising a tank 2 containing a suitable electrolyte 3, in which are immersed a plurality of film-forming electrodes 4 and 5. The electrodes 4 and 5 may be connected, in the usual manner, to an alternating-current working circuit, indicated at 6, and a direct-current excitation may be provided for the condenser 1 in the usual manner. For example, a balance coil 7 may be connected, in parallel relation, to the condenser, and a direct-current generator 8 may be connected between the midpoint of the balance coil 7 and an auxiliary non-film-forming electrode 9, which is immersed in the electrolyte 3. The generator 8 has a shunt field winding 10, and the value of its excitation may be suitably controlled by means of a relay device 11 which is adapted to insert or remove a resistor 12 from the shunt field circuit. The relay device 11 is controlled by an auxiliary condenser 13 comprising a plurality of film-forming electrodes 14 and 15 immersed in an electrolyte 16 of the desired degree of concentration. The film-forming electrode 14 is connected to the electrode 5 of the condenser 1, as indicated at 17, and the other electrode 15 is connected to a coil 18, of an electromagnet 18a, which is also connected to the resistor 12. The electromagnet 18a is adapted to actuate an armature 19 which is connected to close a shunt circuit for the resistor 12.

The relay device 11 normally shunts the resistor 12 from the field circuit 10 of the generator 8, which is adjusted to provide a satisfactory direct-current excitation for the condenser 1, under normal operating conditions. The concentration of the electrolyte 16 of the condenser 13 is such that, when the maximum value which it is desired to maintain impressed on the condenser 1 is exceeded, a leakage current traverses the condenser 13, which energizes the coil 18, thereby causing the resistor 12 to be inserted in series with the field winding 10 by actuating the armature 19. It will be appreciated, of course, that, when the maximum value of potential impressed upon the condenser 1 falls to the value it is desired to maintain, or below this value, no current traverses the condenser 13, and the relay device 11 assumes its normal position to shunt the resistor 12 from the field circuit 10 of the generator 8. The direct-current excitation is thus restored to its original value, under normal operating conditions. It is apparent from the foregoing description that the auxiliary apparatus, connected to the condenser, will maintain a substantially constant maximum value of impressed voltage and maintain the capacitance of the condenser substantially constant, thereby insuring satisfactory operating conditions.

In Fig. 2 is shown a slight modification of my invention, in which mechanical means is embodied in a control circuit for the relay device 11, which varies the degree of excitation of the generator 8. In this instance, a coil 20 of an electromagnet 21 is connected to the resistor 12 and to the electrode 5 of the condenser 1. The electromagnet 21 is adapted to actuate a pivotally supported armature member 22, which is maintained in spaced relation from the electromagnet by a body portion of resistor material 23 that is adapted to have its resistance varied by the application of pressure. The material 23 that may be satisfactorily employed may consist of comminuted carbon, or other similar material. A suitable weight 24 may be connected to the armature member 22 and is so adjusted as to insure that no pressure is exerted upon the material 23, except when the electromagnet 21 is sufficiently energized. A source of direct current 25 may be connected to the armature member 22, and, through the coil 18, to the other side of the material 23, which normally maintains this circuit open.

The operation of the modified form of apparatus illustrated in Fig. 2 is quite similar to the operation of the apparatus shown in Fig. 1. For example, when the maximum value of alternating potential impressed upon the condenser 1 exceeds a certain predetermined value, a current of such value from the condenser traverses the coil 20 that the electromagnet 21 attracts the armature 22, and causes the material 23 to be sufficiently compressed to close the direct-current circuit through the coil 18 of the relay device 11. The armature 19 is thus actuated to open the circuit, which shunts the resistor 12 from the field circuit 10, thereby causing the direct-current excitation provided by the generator 8 to be decreased. When the direct-current excitation is thus decreased, the maximum value of alternating potential impressed upon the condenser 1 is thus reduced with the reduced value of direct-current excitation. When normal conditions are restored, the current through the magnet coil is not sufficient to actuate the electromagnet 21, and the weights 24 release the pressure of the armature 22 upon the material 23, thereby opening the direct-current circuit that energizes the coil 18 of the relay device 11. The armature 19 of the relay device assumes its normal position and shunts the resistor 12 from the field winding 10 of the generator 8. The excitation of the generator 8 is, therefore, readjusted to its original value.

It will be appreciated that, in both of the condenser circuits above described, if steady conditions obtain in the alternating-current working circuit, the auxiliary apparatus does not function, and the direct-current excitation is provided in the same way as when the condenser is applied to a constant-voltage circuit, with the distinctive feature, however, that I utilize the maximum impressed voltage that will not permit a large leakage flow, as hereinabove pointed out. The apparatus, however, is sufficiently sensitive to changes in the maximum impressed voltage on the condenser to obviate the bad effects experienced by a continuously varying impressed voltage.

Although I have shown and specifically described a plurality of condensers provided with means for maintaining a constant value of maximum impressed voltage and, consequently, a constant capacitance, it is obvious that minor changes may be made in the connections thereof and in the construction of the equipment within the scope of my invention, and I desire, therefore, that no limitations shall be imposed except such as are indicated in the appended claims.

I claim as my invention:—

1. The combination with an electrolytic condenser comprising a plurality of film-forming electrodes immersed in a suitable electrolyte, and means for impressing potential thereon, of means for providing the condenser with a direct-current excitation, and means for varying the direct-current excitation inversely as the maximum value of potential impressed between the condenser electrodes and the electrolyte to maintain the capacitance of the condenser substantially constant.

2. The combination with an electrolytic condenser comprising a plurality of electrodes immersed in an electrolyte, of means for impressing potential thereon, means for providing a direct-current excitation for the condenser, and electro-responsive means for automatically varying the direct-current excitation inversely as the maximum value of potential impressed between the condenser electrodes and the electrolyte to maintain the capacitance of the condenser substantially constant.

3. The combination with an electrolytic condenser comprising a plurality of film-forming electrodes immersed in an electrolyte, of means for providing a direct-current excitation therefor, and means for varying the excitation, said means including an auxiliary electrolytic condenser.

4. The combination with an electrolytic condenser comprising a plurality of film-forming electrodes immersed in a suitable electrolyte, of a direct-current generator connected to deliver a direct-current to the condenser, and means for controlling the value of the direct current, said means including an auxiliary electrolytic condenser.

5. The combination with an electrolytic condenser comprising a plurality of film-forming electrodes immersed in a suitable electrolyte, of a direct-current generator connected to deliver a direct current to the condenser and means for varying the excitation of the generator, said means including an auxiliary electrolytic condenser, and a relay device adapted to vary the resistance of the field circuit of the direct-current generator.

6. The combination with an electrolytic condenser comprising a plurality of film-forming electrodes immersed in a suitable electrolyte, of a direct-current generator connected to deliver a direct current to the condenser and means for varying the value of the excitation of the direct-current generator, said means including an electromagnetic device connected to the condenser and to the field circuit of the generator.

7. The combination with an electrolytic condenser comprising a plurality of film-forming electrodes immersed in a suitable electrolyte, of a direct-current generator connected to deliver a direct current to the condenser, and means for varying the degree of excitation of the generator, said means including an electromagnetic device connected to the condenser and to the field circuit of the generator, and a relay device controlled by the electromagnetic device and adapted to vary the resistance of the field circuit of the generator.

8. An electrolytic condenser comprising a plurality of film-forming electrodes immersed in a suitable electrolyte, an auxiliary non-film-forming electrode immersed in the electrolyte, a shunt wound direct-current generator connected to the auxiliary electrode and in circuit with the other electrodes, and means for varying the resistance of the shunt field of the direct-current generator, said means being governed by the potential impressed upon the condenser.

9. An electrolytic condenser comprising a plurality of film-forming electrodes and an auxiliary non-film-forming electrode, all immersed in a suitable electrolyte, an impedance device connected to the film-forming electrodes, a direct-current generator connected to the mid-point of the impedance device and to the auxiliary non-film-forming electrode, and means for controlling the excitation of the direct-current generator, said means being governed by the potential impressed upon the condenser.

10. The combination with an electrolytic apparatus having filmed electrodes and having terminals for impressing alternating voltages thereon, of a source of uni-directional voltage connected with the apparatus to excite the same, and means responsive to variation of the alternating voltage to vary the exciting voltage inversely thereto.

11. The combination with an electrolytic apparatus having filmed electrodes and having terminals for impressing alternating voltage thereon, of a source of uni-directional voltage connected with the apparatus to excite the same, and automatic means for varying the exciting voltage inversely as the alternating voltage to maintain a film stress of substantially constant maximum.

12. The combination with an electrolytic apparatus having filmed electrodes and terminals for impressing alternating voltage thereon, of a source of uni-directional voltage connected with the apparatus to excite the same, and means for maintaining in the apparatus a film stress of substantially constant maximum, said means comprising mechanism for cutting resistance into and out of circuit with said uni-directional source, and controlling devices for said mechanism in parallel with the electrolytic apparatus and with said source.

In testimony whereof, I have hereunto subscribed by name this 29th day of December, 1919.

JOSEPH SLEPIAN.